US006382125B1

(12) United States Patent
Tamura

(10) Patent No.: US 6,382,125 B1
(45) Date of Patent: May 7, 2002

(54) TEMPERATURE CONTROL MATERIAL AND TEMPERATURE CONTROL METHOD USING THE SAME

(75) Inventor: Toshiyuki Tamura, Mishima (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/422,077

(22) Filed: Oct. 21, 1999

(30) Foreign Application Priority Data

| Oct. 22, 1998 | (JP) | 10-301237 |
| Oct. 29, 1998 | (JP) | 10-301239 |
| Jul. 6, 1999 | (JP) | 11-202948 |
| Sep. 29, 1999 | (JP) | 11-275875 |

(51) Int. Cl.⁷ .................. G01K 11/12; G01K 1/02; B41M 5/28; B41M 5/136; B41M 5/132; G01D 5/26
(52) U.S. Cl. .............. 116/207; 374/102; 374/106; 374/162; 426/88; 503/201; 116/216
(58) Field of Search .............. 374/161, 106, 374/102–103, 162, 141, 160, 100, 155; 116/207, 216, 217, 218, 219; 426/88; 503/201

(56) References Cited

U.S. PATENT DOCUMENTS

| 2,928,791 A | * | 3/1960 | Loconti |
| 3,631,720 A | * | 1/1972 | Weinstein et al. ............ 73/358 |
| 3,935,960 A | * | 2/1976 | Cornell ........................ 220/260 |
| 4,057,029 A | * | 11/1977 | Seiter ........................ 116/114 V |
| 4,067,840 A | * | 1/1978 | Wolf ........................ 260/29.6 R |
| 4,189,399 A | * | 2/1980 | Patel ........................ 252/408 |
| 4,280,361 A | * | 7/1981 | Sala ........................... 73/356 |
| 4,357,179 A | * | 11/1982 | Adams et al. ............... 148/1.5 |
| 4,428,321 A | * | 1/1984 | Arens ........................ 116/217 |
| 4,469,452 A | * | 9/1984 | Sharpless et al. ........... 374/160 |
| 4,601,588 A | * | 7/1986 | Takahara et al. ............ 374/106 |
| 4,643,588 A | * | 2/1987 | Postle et al. ................ 374/160 |
| H630 H | * | 4/1989 | Betts et al. ................. 374/106 |
| 4,859,360 A | * | 8/1989 | Suzuki et al. ............ 252/299.7 |
| 5,490,956 A | * | 2/1996 | Kito et al. ................. 252/583 |
| 5,528,280 A | * | 6/1996 | Endo et al. ................ 347/262 |
| 5,538,730 A | * | 7/1996 | Romeo et al. ............. 424/401 |
| 5,552,364 A | * | 9/1996 | Tsutsui et al. ............. 503/201 |
| 5,559,075 A | * | 9/1996 | Leenders et al. ........... 503/201 |
| 5,585,320 A | * | 12/1996 | Tsutsui et al. ............. 503/204 |
| 5,663,115 A | | 9/1997 | Naito et al. |
| 5,667,303 A | * | 9/1997 | Arens et al. ............... 374/102 |
| 5,667,943 A | * | 9/1997 | Boggs et al. ............... 430/343 |
| 5,710,094 A | * | 1/1998 | Minami et al. ............ 503/204 |
| 5,779,364 A | * | 7/1998 | Connelongo et al. ....... 374/160 |
| 5,795,065 A | * | 8/1998 | Barham ..................... 374/106 |
| 5,849,651 A | * | 12/1998 | Takayama et al. .......... 503/201 |

(List continued on next page.)

FOREIGN PATENT DOCUMENTS

JP    8-197853    8/1996

Primary Examiner—Diego Gutierrez
Assistant Examiner—Gail Verbitsky
(74) Attorney, Agent, or Firm—Oblon, Spivak, McClelland, Maier & Neustadt, P.C.

(57) ABSTRACT

Temperature control is carried out with a temperature control material comprising a temperature indicator whose developed color density differs according to temperature, which is irreversible at environmental temperature, which changes its color according to crystal or non-crystal, or phase separation or non-phase separation, and whose glass transition temperature is set to a temperature higher than control temperature, by irradiating the temperature indicator with light having a wavelength absorbed by a color developed by the temperature indicator and detecting the intensity of the reflected light or transmitted light. Accordingly, even when the temperature becomes higher than control temperature temporarily, temperature control can be carried out smoothly thereafter.

14 Claims, 11 Drawing Sheets

A: COLOR DEVELOPING MATERIAL (LEUCO DYE)
B: DEVELOPER (PHENOLIC COMPOUND)
C: RERSIBLE MATERIAL (PREGNENOLONE)
Tg: GLASS TRANSITION TEMPERATURE
Tc: CRYSTALLIZATION TEMPERATURE
Tm: MELTING POINT

U.S. PATENT DOCUMENTS

| | | | | |
|---|---|---|---|---|
| 5,856,060 A | * | 1/1999 | Kawamura et al. | 430/201 |
| 5,869,420 A | * | 2/1999 | Naito | 503/201 |
| 5,981,115 A | * | 11/1999 | Furuya et al. | 430/19 |
| 6,010,808 A | * | 1/2000 | Naito et al. | 430/19 |
| 6,015,770 A | * | 1/2000 | Amano et al. | 503/201 |
| 6,017,386 A | * | 1/2000 | Sano et al. | 106/31.32 |
| 6,048,387 A | * | 4/2000 | Shibahashi et al. | 106/31.21 |
| 6,090,192 A | * | 7/2000 | Torii et al. | 106/31.18 |
| 6,090,748 A | * | 7/2000 | Furuya et al. | 503/201 |
| 6,103,351 A | * | 8/2000 | Ram et al. | 428/195 |

* cited by examiner

A: COLOR DEVELOPING MATERIAL (LEUCO DYE)
B: DEVELOPER (PHENOLIC COMPOUND)
C: RERSIBLE MATERIAL (PREGNENOLONE)
Tg: GLASS TRANSITION TEMPERATURE
Tc: CRYSTALLIZATION TEMPERATURE
Tm: MELTING POINT

Fig. 9

| TIME (hr) | 0°C | | 10°C | | 25°C | | 40°C | |
|---|---|---|---|---|---|---|---|---|
| | ADDRESS | REFLECTANCE | ADDRESS | REFLECTANCE | ADDRESS | REFLECTANCE | ADDRESS | REFLECTANCE |
| 0 | 0000H | F9H | 0080H | F9H | 0140H | F9H | 0200H | F9H |
| ··· | ··· | ··· | ··· | ··· | ··· | ··· | ··· | ··· |
| 3 | 0003H | E4H | 0083H | D4H | 0143H | B2H | 0203H | 5BH |
| ··· | ··· | ··· | ··· | ··· | ··· | ··· | ··· | ··· |
| 5 | 0005H | D3H | 0085H | C6H | 0145H | 93H | 0205H | 33H |
| ··· | ··· | ··· | ··· | ··· | ··· | ··· | ··· | ··· |
| 10 | 000AH | CAH | 008AH | B2H | 014AH | 75H | 020AH | 0FH |
| ··· | ··· | ··· | ··· | ··· | ··· | ··· | ··· | ··· |
| 15 | 000FH | C8H | 008FH | ADH | 014FH | 6BH | 020FH | 0AH |
| ··· | ··· | ··· | ··· | ··· | ··· | ··· | ··· | ··· |
| 24 | 0018H | C5H | 0098H | A8H | 0158H | 66H | 0218H | 5H |
| ··· | ··· | ··· | ··· | ··· | ··· | ··· | ··· | ··· |
| 48 | 0030H | C1H | 00B0H | A8H | 0170H | 66H | 0230H | 5H |

Fig. 10

| | 0°C | 5°C | 10°C | 15°C | 20°C | 25°C | 30°C | 35°C | 40°C |
|---|---|---|---|---|---|---|---|---|---|
| 0 hr | 0000H | 0040H | 0080H | 00C0H | 0100H | 0140H | 0180H | 00C0H | 0200H |
| 1 hr | 0001H | 0041H | 0081H | 00C1H | 0101H | 0141H | | | |
| 2 hr | 0002H | 0042H | 0082H | 00C2H | 0102H | 0142H | | | |
| ⋮ | ⋮ | ⋮ | ⋮ | ⋮ | ⋮ | ⋮ | ⋮ | ⋮ | ⋮ |
| 48 hr | 0030H | 0070H | 00B0 | 00E0H | 0130H | 0170H | 01B0 | 01E0H | 0230H |

Fig. 12

| TIME(hr) | ADDRESS | REFLECTANCE | TIME(hr) | ADDRESS | REFLECTANCE |
|---|---|---|---|---|---|
| 1 | 0100H | F9H | 20 | 1400H | E6H |
| 1 | 0101H | F9H | 20 | 1401H | E6H |
|  | ----- |  |  | ----- |  |
| 1 | 010AH | F9H | 20 | 140AH | E1H |
|  | ----- |  |  | ----- |  |
| 1 | 0119H | F7H | 20 | 1419H | BCH |
|  | ----- |  |  | ----- |  |
| 1 | 0128H | F4H | 20 | 1428H | 83H |
| 2 | 0200H | F8H | 27 | 1B00H | E4H |
| 2 | 0201H | F8H | 27 | 1B01H | E4H |
|  | ----- |  |  | ----- |  |
|  | 020AH | F8H | 27 | 1B0AH | DCH |
|  | ----- |  |  | ----- |  |
|  | 0219H | F3H |  | 1B19H | B0H |
|  | ----- |  |  | ----- |  |
| 2 | 0228H | DEH | 27 | 1B28H | 71H |
|  | ----- |  |  | ----- |  |
| 10 | 0A00H | EFH | 48 | 3000H | DBH |
| 10 | 0A01H | EFH | 48 | 3001H | DAH |
|  | ----- |  |  | ----- |  |
|  | 0A0AH | ECH |  | 300AH | CCH |
|  | ----- |  |  | ----- |  |
| 10 | 0A19H | D7H | 48 | 3019H | 8FH |
|  | ----- |  |  | ----- |  |
| 10 | 0A28H | ACH | 48 | 3028H | 3CH |

Fig. 14

| TIME(hr) | ADDRESS | REFLECTANCE | TIME(hr) | ADDRESS | REFLECTANCE |
|---|---|---|---|---|---|
| 1 | 0100H | 01H | 20 | 1400H | 18H |
| 1 | 0101H | 01H | 20 | 1401H | 18H |
|  | ----- |  |  | ----- |  |
| 1 | 010AH | 01H | 20 | 140AH | 1EH |
|  | ----- |  |  | ----- |  |
| 1 | 0119H | 04H | 20 | 1419H | 4BH |
|  | ----- |  |  | ----- |  |
| 1 | 0128H | 07H | 20 | 1428H | 5FH |
| 2 | 0200H | 02H | 27 | 1B00H | 1AH |
| 2 | 0201H | 02H | 27 | 1B01H | 1AH |
|  | ----- |  |  | ----- |  |
|  | 020AH | 02H | 27 | 1B0AH | 24H |
|  | ----- |  |  | ----- |  |
|  | 0219H | 07H |  | 1B19H | 59H |
|  | ----- |  |  | ----- |  |
| 2 | 0228H | 22H | 27 | 1B28H | A6H |
|  | ----- |  |  | ----- |  |
| 10 | 0A00H | 0DH | 48 | 3000H | 25H |
| 10 | 0A01H | 0DH | 48 | 3001H | 26H |
|  | ----- |  |  | ----- |  |
|  | 0A0AH | 11H |  | 300AH | 37H |
|  | ----- |  |  | ----- |  |
| 10 | 0A19H | 2BH | 48 | 3019H | 81H |
|  | ----- |  |  | ----- |  |
| 10 | 0A28H | 5FH | 48 | 3028H | E6H |

TEMPERATURE CONTROL MATERIAL AND TEMPERATURE CONTROL METHOD USING THE SAME

BACKGROUND OF THE INVENTION

1. Field of the Invention

The present invention relates to a temperature control material formed to control the temperature of an object of control using a temperature indicator which changes its color by temperature and a temperature control method using the same.

2. Description of the Prior Art

Out of conventionally used temperature indicators, temperature indicators which respond to temperature to change their colors include thermochromic organic dyes such as ethylene derivatives obtained by substituting the condensate aromatic ring of a spiropirane, bianthrone or dixanthylene, a metallic complex salt crystal made of $CoCl_2.2(CH_2)6N_4.10H_2O$ and a combination of an electron donor color developing compound, electron acceptor compound and a polar organic compound. The temperature of a temperature control label or the like made from any one of these temperature indicators is judged by observing its color change by temperature visually.

Temperature indicators are roughly divided into reversible and irreversible types. The reversible type changes its color each time temperature varies and the irreversible type changes its color at a certain temperature and does not return to its original color.

The reversible type is used to tell the time to have a drink such as beer or to arouse attention visually.

The irreversible type is used to control the temperature of a vegetable, fresh food or the like and described in Examined Japanese Patent Publication No. sho 58-10709 as a temperature indicator which records temperature history. That is, ink whose viscosity changes according to temperature (for example, ink containing a dye dissolved in oleyl alcohol) permeates into a penetrant and how long the irreversible temperature indicator has been exposed to a temperature higher than a set temperature can be detected from the length of ink permeation. There is also available an irreversible temperature indicator which comprises a plurality of layers over the label, that is, an ink layer, separate layer, porous layer and display section. The separate layer is removed when temperature control is started, and the porous layer is provided to control the ink permeation time of the ink layer. When the set temperatures of these layers are lower than room temperature, storing means is required when temperature control is not started to effect low-temperature irreversibility. Thus, the irreversible temperature indicator is expensive and has a complex structure.

Unexamined Japanese Patent Publication No. Hei 8-197853 discloses an alarm method which makes use of the fact that the dispersion speed of molecules greatly changes when the temperature exceeds the glass transition temperature as the set temperature of a temperature indicator.

The problems of these prior arts will be described below. The present invention relates to an irreversible temperature indicator whose set temperature is lower than environmental temperature. A temperature indicator disclosed by Examined Japanese Patent Publication No. Sho 58-10709 requires storing means when temperature control is not carried out and hence, is expensive and complex in structure, and a temperature indicator disclosed by Unexamined Japanese Patent Publication No. Hei 8-197853 merely gives an alarm that the temperature of an article of commerce to be controlled exceeds the set temperature (glass transition temperature) by a quick change in the density of its developed color and cannot monitor which environmental temperature the article is kept for a long time. That is, when an article of commerce which must be maintained at a low temperature is delivered to a shop in a chill car and transferred to a refrigerator at a shop from the chill car, the density of a color developed by a temperature indicator changes upon exposure to the outside temperature as the glass transition temperature of the temperature indicator is generally lower than normal temperature. Therefore, the temperature indicator cannot be used for the subsequent temperature control any longer.

SUMMARY OF THE INVENTION

It is an object of the present invention to obtain a temperature control material which can carry out temperature control without hindrance after the temperature exceeds control temperature temporarily and a temperature control method using the same.

The object of the present invention is achieved by the novel temperature control material and the temperature control method using the same of the present invention.

According to one aspect of the present invention, there is provided a temperature control material comprising a temperature indicator whose developed color density differs according to temperature, which is irreversible at environmental temperature, which changes its color according to crystal or non-crystal, or phase separation or non-phase separation and whose glass transition temperature is set to a temperature higher than control temperature. The temperature indicator may contain a binder resin.

According to another aspect of the present invention, there is provided a temperature control method using a temperature indicator whose developed color density differs according to temperature, which is irreversible at environmental temperature and which changes its color according to crystal or non-crystal, or phase separation or non-phase separation. That is, the method of the present invention comprises the step of setting the glass transition temperature of the temperature indicator at a temperature higher than control temperature and the step of carrying out temperature control by irradiating the temperature indicator with light having a wavelength which is absorbed by a color developed by the temperature indicator and detecting the intensity of the reflected light or transmitted light. It is possible to give an alarm that the temperature indicator is exposed to a temperature higher than its glass transition temperature with its color development in a short period of time.

According to still another aspect of the present invention, temperature control is carried out by attaching a temperature control material comprising a temperature indicator which is distributed at a temperature lower than the outside temperature, whose developed color density differs according to temperature for an object of control which is exposed to the environment of the outside temperature for several minutes in the distribution step, which is irreversible at environmental temperature and which changes its color according to crystal or non-crystal, or phase separation or non-phase separation and whose glass transition temperature is set to a temperature higher than control temperature, by irradiating the temperature indicator with light having a wavelength absorbed by a color developed by the temperature indicator, and by detecting the intensity of the reflected light or transmitted light.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which:

FIG. 9 is an address table written in a ROM;

FIG. 10 is a table showing the relationship between the temperature and density of the temperature indicator;

FIG. 12 shows the ROM table of the reader;

FIG. 14 is the ROM table of the reader.

DETAILED DESCRIPTION OF THE PREFERRED EMBODIMENTS

1. Outline

Figure 1:
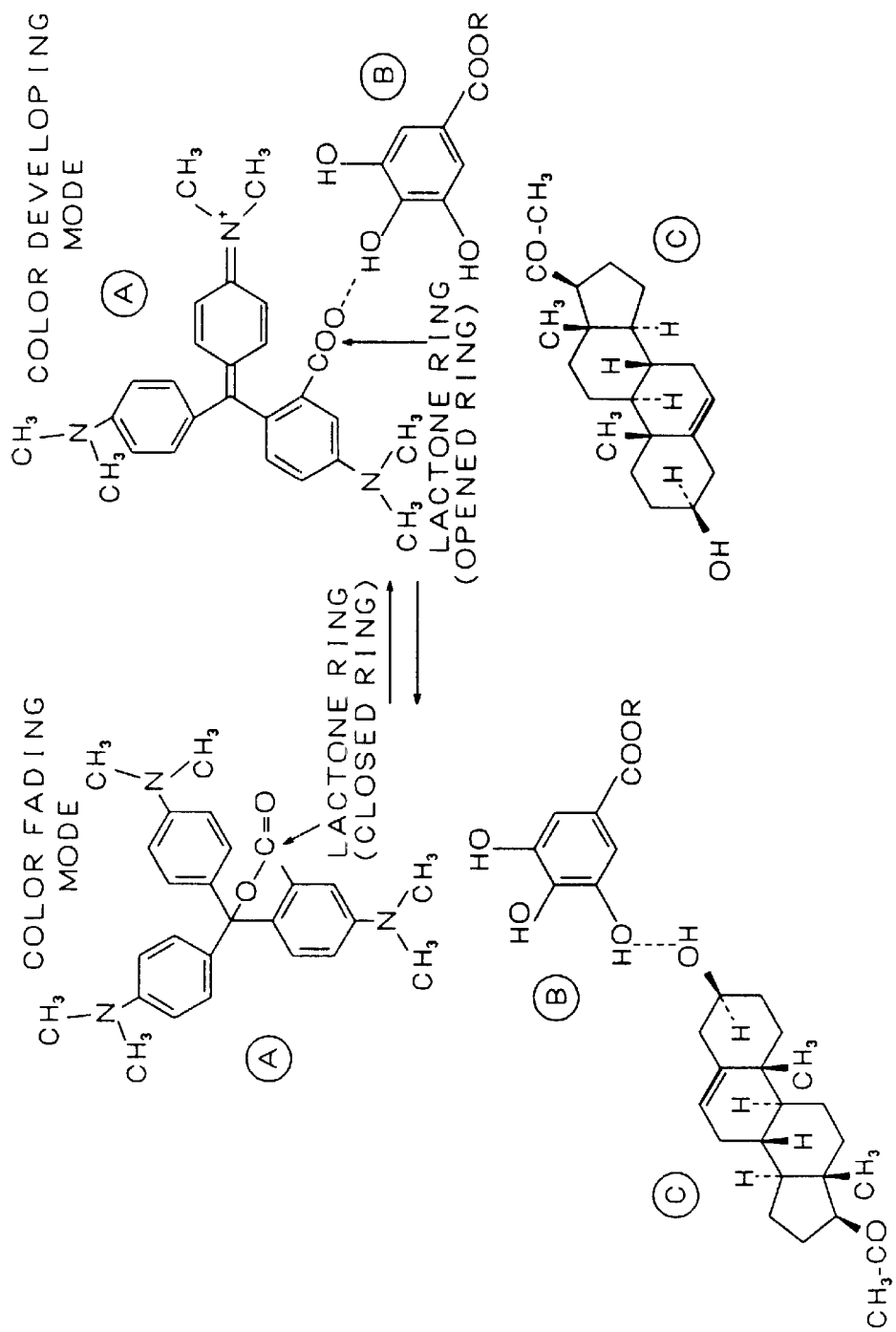
FIG. 1 is a diagram of the basic principle of the color development of rewritable ink used in the embodiment of the present invention.

An embodiment of the present invention will be described hereinafter. A temperature indicator which responds to temperature partly or wholly to change its color is first provided and a temperature control material in which information is set by this temperature indicator is provided. That is, an object to be read such as a code or mark which can be read mechanically is printed or coated with a temperature indicator which responds to temperature, or printed on a label with a thermal head by a heat transfer printing method, and the label is pasted on an article whose temperature is to be controlled. Alternatively, the code or mark is printed directly on an article whose temperature is to be controlled. The temperature indicator is a material whose density changes by temperature, and a material whose developed color density differs according to temperature is used. A rewritable material can be used and the following materials are given as examples of the rewritable material.

electron donor color developing compound (leuco dye)

phenyl methane-based compounds (such as fluoranes and phenyl phthalides), indolyl phthalides, spiropiranes, leuco auramines, acyl or aryl auramines and the like electron acceptor compound (developers)

compounds having a phenolic hydroxyl group, metal salts of compounds having a phenolic hydroxyl group, triazoles, carboxylic acids, metal salts of carboxylic acids and the like reversible material Steroid-based materials whose glass transition temperature is higher than measurement environmental temperature when they are prepared in the form of final ink can be used. For example, pregnenolone and methylandrostenediol can be used.

resin

A styrene resin, styrene-methacrylic acid copolymer, ethylene-vinyl acetate copolymer, acrylic resin and the like can be used.

The glass transition temperature (Tgc) of the resin is set to a temperature higher than the glass transition temperature (Tgr) of a temperature indicator comprising an electron acceptor compound, electron donor compound and reversible material.

Stated specifically, a styrene-methacrylic acid copolymer (A-91: Dainippon Ink and Chemicals, Inc., 10% of methacrylic acid, Tgc: 126° C.) is used as a binder resin, crystal violet lactone (CVL) is used as a leuco dye, propyl gallate (PG) is used as a developer, and pregnenolone (PRN) is used as a reversible material to prepare ink.

<temperature indicator>
temperature indicating material

| | |
|---|---|
| CVL | 1 part by weight |
| PG | 1 part by weight |
| PRN | 10 parts by weight | binder resin

| | |
|---|---|
| A-91 | 4 parts by weight |

Tgr of the temperature indicating material consisting of the above three components is 44° C., and a binder resin used in this embodiment has a glass transition temperature higher than Tgr. A-91 has a Tgc of 126° C.

As for the concrete method of producing the temperature indicator, A-91 is completely dissolved in 84 parts by weight of a mixed solvent of toluene and cyclohexanone (4:1), the above temperature indicating material components are added, and glass beads of 3 mm in diameter are added and stirred with a paint shaker for 2 hours to prepare a coating solution. The thus obtained coating solution is coated on polyethylene terephthalate (PET, 38 μm) with a bar coater #40 to obtain a temperature indicator. This temperature indicator is pasted on ground paper, a 3,5 μm-thick protective polyethylene naphthalate (PEN) film comprising a 0.2 μm-thick back coat layer is pasted on this, and the temperature indicator and the protective film are joined together by a fixing roller heated at 120° C. to complete a temperature control material. This temperature control material is initialized (erased) by heating and quenching with a thermal head. Color development by temperature proceeds in initialized portions of the material. That is, portions initialized by temperature are different from one another in reflectance.

| condition | reflectance |
|---|---|
| erasure density | 0.69 (initial reflectance) |
| 40° C. | 0.21 (after 24 hours) |
| 25° C. | 0.40 (after 24 hours) |
| 10° C. | 0.53 (after 24 hours) |
| 0° C. | 0.59 (after 24 hours) |

It is possible to know the storage environment of the temperature indicator by irradiating the above-described temperature indicator with light having a wavelength absorbed by a color developed by the temperature indicator and detecting the density of the temperature indicator, that is, the intensity of reflected light or transmitted light.

The styrene-methacrylic acid copolymer having a Tgc of 126° C. is used as a binder resin. When Tgc of this binder resin is changed to a temperature higher than Tgr of the temperature indicating material, the color development speed after initialization can be changed. For example, when the content of methacrylic acid is changed from 10% (A91) to 13% (A-14: Dainippon Ink and Chemicals, Inc.), Tgc is shifted to 135° C. and the color development speed after initialization is reduced. When a polystyrene resin having a Tgc of 92° C. and containing no methacrylic acid is used, the color development speed is increased.

Tgr of the temperature indicating material is set to a temperature higher than measurement environmental temperature and Tgc of the binder resin is set to a temperature higher than Tgr. The color development speed is controlled by changing Tgc of the binder resin. Since this temperature indicator starts temperature control after it is initialized by heating and quenching with a thermal head, a separator is not required.

Color development proceeds in portions initialized by the time and temperature of the temperature indicator. Then, to carry out temperature control accurately, an erasure time is input into a pattern which is initialized (erased) with the thermal head.

For instance, a bar code is formed of erased portions and unerased portions, and an erasure time is included in bar code information. Stated more specifically, when the issue time is 00:00 on Apr. 1, 1998, "4998040100001" is printed on a bar code. The first "49" indicates a flag, "98" indicate the year, "0401" indicates April 1, and "0000" indicates 00:00. The last "1" indicates a check character in accordance with the format of JAN13. In this embodiment, temperature control start time grasping means for grasping a temperature control start time by reading the bar code including time information of a temperature control material and time recognition means for grasping a time when the temperature is actually detected are provided and means for calculating the total time of temperature control by means of the above temperature control start time grasping means and the time recognition means, detecting means for detecting the density of a color developed at environmental temperature after erasure, that is, the intensity of reflected light by irradiating the temperature indicator with light having a wavelength absorbed when the temperature indicator develops a color, and a reader having a table in which the above temperature indicator is recorded are used to detect an exposure temperature. That is, the preferred embodiment introduces a method for detecting average exposure temperature by the table in which the above temperature indicator is recorded, the intensity of reflected light of the temperature indicator at the time of actually measuring the temperature, and the total time of temperature.

2. Detailed Description

A preferred embodiment of the present invention will be described with reference to the accompanying drawings. A temperature indicator 4 comprises an electron donor color developing compound, an electron acceptor compound, a reversible material and a binder resin. Generally speaking, the electron donor color developing compound refers to a precursor compound which develops a color, and the electron acceptor compound refers to a developer. When interaction between the electron donor color developing compound and the electron acceptor compound becomes large, a color is developed and when the reaction becomes small, the color fades. The reversible material used in this embodiment refers to a material which can change interaction between the electron donor color developing compound and the electron acceptor compound reversibly and indirectly by increasing or reducing interaction between the electron donor color developing compound and the electron acceptor compound.

This principle is simply shown in FIG. 1. The figure shows a case where crystal violet lactone A is used as the electron donor color developing compound (which encompasses a leuco compound), propyl gallate B is used as the electron acceptor compound and pregnenolone C is used as the reversible material.

In a color fading mode, interaction between A and B is small and B intensifies the interaction. In a color developing mode, interaction between A and B is strong and interaction between B and C is weak.

Figure 2:
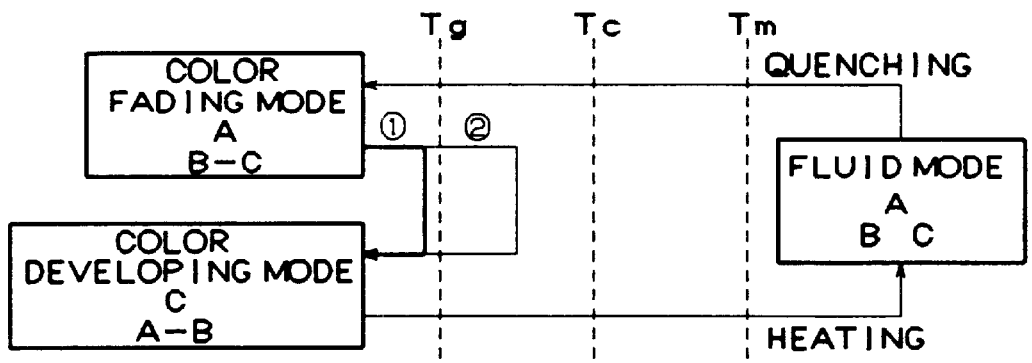
FIG. 2 is a diagram of application principle to a rewritable temperature indicator.

With reference to FIG. 2, the thermodynamic reversibility of the composition system of the temperature indicator 4 will be described. In a color developing mode, interaction between A and B is strong and C is existent alone in a crystal form. When the temperature indicator 4 is heated at a temperature higher than the melting point Tm, it becomes a fluid, interaction between A and B is weakened, and interaction between B and C is intensified. When the temperature indicator is quenched from this state, C is solidified (becomes amorphous) while it contains B and a fading mode is retained. When the temperature indicator is heated at a temperature higher than the glass transition temperature Tg from this state, B is dispersed, thereby starting color development. The dispersion speed of B greatly changes around the glass transition temperature Tg. Further, when the temperature indicator is heated at a temperature range of the crystallization temperature Tc or more and less than the melting point Tm, the dispersion speed is further accelerated and a color is developed instantaneously.

A change from a color developing mode to a fading mode is carried out by a shift between crystal and non-crystal or a shift between non-phase separation between B and C and phase separation between B and C. In the non-phase separation state, B is bonded to C and in the phase separation state, B develops a color by increasing its interaction with A and C is crystallized.

In the invention disclosed by Unexamined Japanese Patent Publication No. Hei 8-197853, it is stated that a material can be used as a temperature control material using this glass transition temperature Tg. This is a method making use of the dispersion speed of B (developer). That is, this invention is a method of detecting the boundary between ① and ② in FIG. 2.

In contrast to this, in this embodiment, the area ① is used in the principle diagram of FIG. 2. The area ① is used to specify a temperature as will be described hereinafter and the area ② can be used to give an alarm. That is, the glass transition temperature Tg of the temperature indicator used in this embodiment which comprises a temperature indicating material and a binder resin is set to a temperature higher than an expected (control) temperature in the measurement environment. For example, when a vegetable is taken as an object of control, the temperature of the vegetable when it is distributed is preferably 10° C. or less. In contrast to this, when the transportation of the vegetable by a truck is considered, it is inevitable that the vegetable is exposed to a temperature of about 40° C. (outside temperature) in a short period of time upon loading into and unloading from the truck. Then, when the exposure of the vegetable to a temperature of about 40° C. for a short period of time, i.e., normal time is permitted, it is necessary to set the glass transition temperature Tg of the temperature indicator to a temperature higher than 40° C. For instance, when GN-2 is used as a leuco dye, PG is used as a developer, PRN is used as a reversible material and A91 is used as a resin, the obtained temperature indicator has a glass transition temperature of 44° C. which satisfies the above requirement. Under this condition, the area ① in FIG. 2 is used at a temperature up to 40° C. When the temperature is higher than 44° C., for example, 50° C., the temperature indicator develops a color in a very short period of time and color development proceeds almost completely in less than 10 minutes. "The very short period of time" is defined as the time shorter than the time for temperature control. Accordingly, "the temperature indicator develops a color in a very short period of time" means the quick color development of the temperature indicator as against the time for temperature control. Then, in this embodiment, an alarm is displayed by this quick color development. In this case, the area ② in FIG. 2 is used.

It is supposed to use a developer having low speed dispersion in order to avoid color development by the exposure under the environment of high temperature in very short period of time. However, this is not well solution because the reaction of the developer becomes slowly under the environment of the control temperature even though the dispersion of the developer becomes slowly around 50° C. Thus, it is preferable to determine the glass transition temperature in consideration of the exposure under high temperature with expected normal time in the distribution of the object for control and the alarm after the exposure under high temperature with the time longer than the normal time, and to select the developer according to the control time. In addition, the normal time is changed depend on a condition of distribution, a kind of the object for control, or the like.

The temperature indicator 4 used in this embodiment comprises a leuco dye (A), developer (B), reversible material (C) and binder resin. The glass transition temperature Tgc of the binder resin is set higher than the glass transition temperature Tgr which is determined by A, B and C.

The composition of the temperature indicator 1 is as follows.

| <temperature indicator 1> | |
|---|---|
| leuco dye: GN-2 | 1 part by weight |
| developer: PG | 1 part by weight |
| reversible material: PRN | 10 parts by weight |
| resin: A-91 | 4 parts by weight |

To produce this temperature indicator 1, the binder resin is completely dissolved in 84 parts by weight of a mixed solvent of toluene and cyclohexanone (4:1), and 1 part by weight of the GN-2 leuco dye, 1 part by weight of the PG developer and 10 parts by weight of the PRN reversible material are added to the solution. Further, glass beads of 3 mm in diameter are added to almost the same level as the liquid level and dispersed with a paint shaker for 2 hours to obtain a coating solution. The coating solution is coated on PET (38 μm) with a bar coater #40 to obtain a temperature indicator 4. The glass transition temperature Tgr of the temperature indicating material consisting of the leuco dye, developer and reversible material of the temperature indicator 4 is 44.5° C. and the glass transition temperature Tgc of the binder resin is 126° C. The glass transition temperature of the binder resin used in the present invention is set higher than the glass transition temperature Tgr of the temperature indicating material. Even when the Tgr of the temperature indicating material is 44.5° C. which is above the measurement range, the dispersion of the developer occurs.

Then, when it is supposed that a temperature control material which responds to a temperature around 10° C. is used for transportation of vegetables and the glass transition temperature of the temperature control material is 10° C. as disclosed by Unexamined Japanese Patent Publication No. Hei 8-197853, as described above, color development proceeds even if the temperature control material is exposed to the outside temperature for only several minutes during the transportation of the goods. In contrast to this, when the glass transition temperature of the temperature indicating material of this embodiment is set to 44.5° C., the temperature indicating material is not so affected by the outside temperature. That is, when the glass transition temperature of the temperature indicating material is set to 44.5° C. as in this embodiment, the temperature indicator does not develop a color in the normal time upon loading into and unloading from a truck and a situation that temperature control cannot be carried out can be prevented without fail.

The glass transition temperature of the binder resin of this embodiment must be set higher than the glass transition temperature of the temperature indicating material. This is because the proceeding of color development is controlled by the binder resin if the glass transition temperature determined by the temperature indicating material is higher than the glass transition temperature of the binder resin. In this embodiment, the glass transition temperatures are determined such that the proceeding of color development is controlled by the temperature indicating material. Conversely, the color development speed after initialization can be controlled by controlling the glass transition temperature of the binder resin to a certain extent.

For example,
<temperature indicator 1>
same as above.
<temperature indicator 2>
The temperature indicating material is the same as that of <temperature indicator 1>.

| leuca dye: GN-2 | 1 part by weight |
|---|---|
| developer: PG | 1 part by weight |
| reversible material: PRN | 10 parts by weight |
| binder resin: A-14 | 4 parts by weight |

(styrene-methacrylic acid copolymer, 13% of methacrylic acid manufactured by Dainippon Ink and Chemicals, Inc.)

The method of producing the temperature indicator is the same as that of <temperature indicator 1>, Tgr is 44.5° C. and Tgc is 135° C.
<temperature indicator 3>
The temperature indicating material is the same as those of <temperature indicator 1> and <temperature indicator 2>.

| binder resin: A-37 | 4 parts by weight |
|---|---|

(styrene-methacrylic copolymer, 22% of methacrylic acid manufactured by Dainippon Ink and Chemicals, Inc.)

The method of producing the temperature indicating material is the same as that of <temperature indicator 1>, Tgr is 44.5° C. and Tgc is 149° C.
<temperature indicator 4>
The temperature indicating material is the same as those of <temperature indicator 1>, <temperature indicator 2> and <temperature indicator 3>.

| binder resin: polystyrene | 4 parts by weight |
|---|---|

The method of producing the temperature indicating material is the same as that of <temperature indicator 1>, Tgr is 44.5° C. and Tgc is 92.4° C.

Figure 3A:
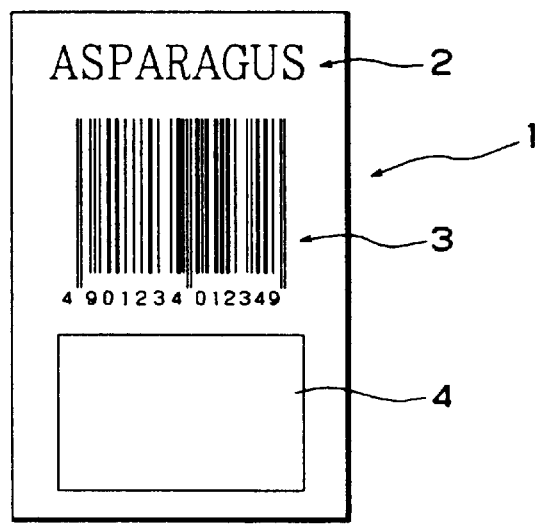
FIG. 3(A) is a plan view of a temperature control material.
Figure 3B:
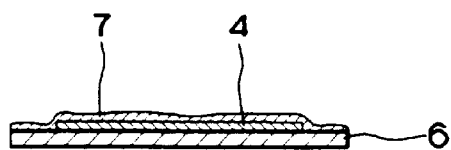
FIG. 3(B) is a vertical front view of the temperature control material.
Figure 4:
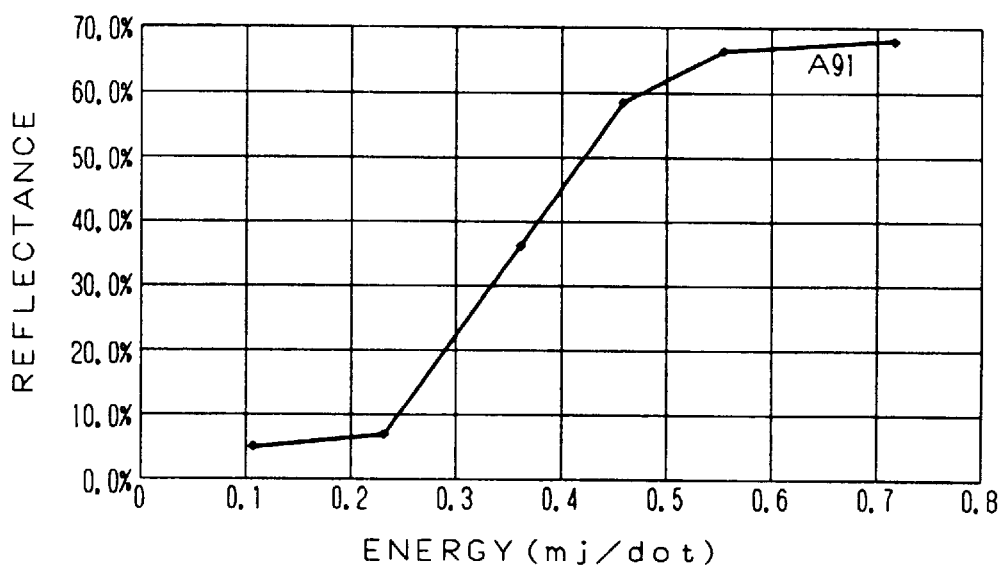
FIG. 4 is a graph showing the relationship between the erasure energy and reflectance of a temperature indicator.

FIG. 3 shows a trial produced temperature control material 1. This temperature control material 1 is formed using heat sensitive paper as a base 6 and a trade name 2 and a trade code 3 can be printed on the base 6. The temperature indicator 4 produced as described above is pasted on the base 6 of the temperature control material 1 and a protective layer 7 is formed on the temperature indicator 4. This protective layer 7 comprises a 0.2 $\mu$m-thick back coat layer on a side opposite to the side in contact with the PEN (3.5 $\mu$m) temperature indicator 4. This back coat layer is obtained by diluting the TS-100 of Kubo Takashi Co., Ltd. 5 times and coating the diluted TS-100 with a bar coater #3. The temperature control material 1 having this protective layer 7 is caused to pass through a heat roller heated at about 120° C. to eliminate air between the protective layer 7 and the temperature indicator 4. The density of the temperature control material 1 thus obtained can be erased by rapidly heating and quenching with a thermal head. The relationship between the application energy of the thermal head and erased density is shown in FIG. 4. Since there is almost no difference in the relationship among the temperature indicators 1 to 4, the relationship of <temperature indicator 1> is shown. The KBE-56-8MGK1-MG thermal head of Kyocera Co., Ltd, is used to erase the density with an application power of 0.3 W and a printing cycle of 4 ms/line. The printing energy is adjusted by controlling the pulse width. In the temperature indicator 4 comprising PRN as the reversible material, the density becomes almost minimum (erased) with an energy of about 0.55 mJ/dot.

Figure 5:
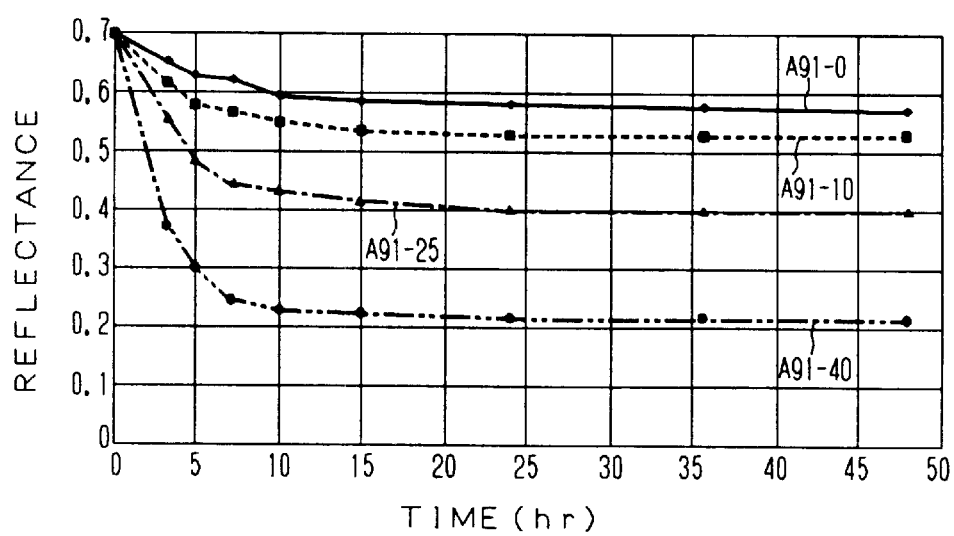
FIG. 5 is a graph showing the temperature and time of the temperature indicator.
Figure 6:
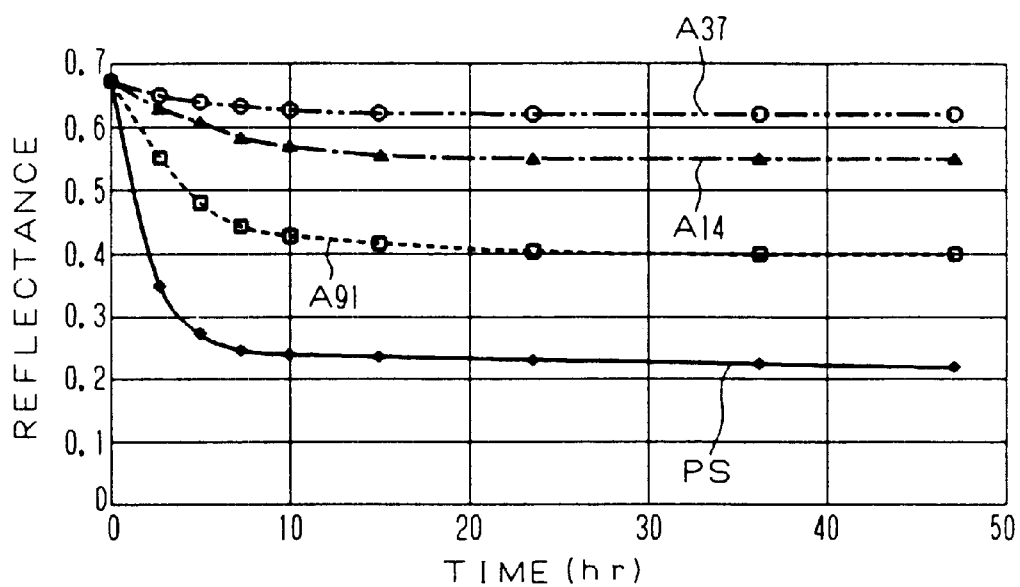
FIG. 6 is a diagram of temperature indication characteristics at 25° C. when a binder resin is changed.

The actual temperature control method will be described below. Before the start of temperature control, read portions of the temperature indicator 4 are erased under the above-described condition of the thermal head. In the portions erased by heat, the density of a developed color differs according to the binder resin as shown in FIG. 5 and changes according to environmental temperature. In FIG. 5, numerals "0", "10", "25" and "40" in A91-0, A91-10, A91-25 and A91-40 indicate temperatures at which the temperature indicator is left, respectively, FIG. 6 shows changes in reflectance at 25° C. when the resins PS, A91, A14 and A37 having different glass transition temperatures are used. The reflectance was measured with the colorimeter of Minolta Co., Ltd.

It is understood from FIG. 6 that when Tgc of the resin is changed, the color development speed is changed. Making use of this fact, temperature control materials 1 having different color development speeds can be obtained. It is seen from FIG. 5 that if the time is known, an average exposure time can be obtained by measuring reflectance because reflectance differs according to temperature.

Figure 7:
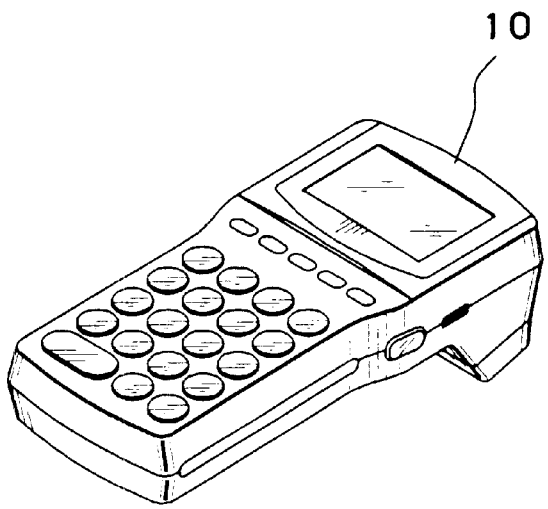
FIG. 7 is a diagram of the appearance of a reader.
Figure 8:
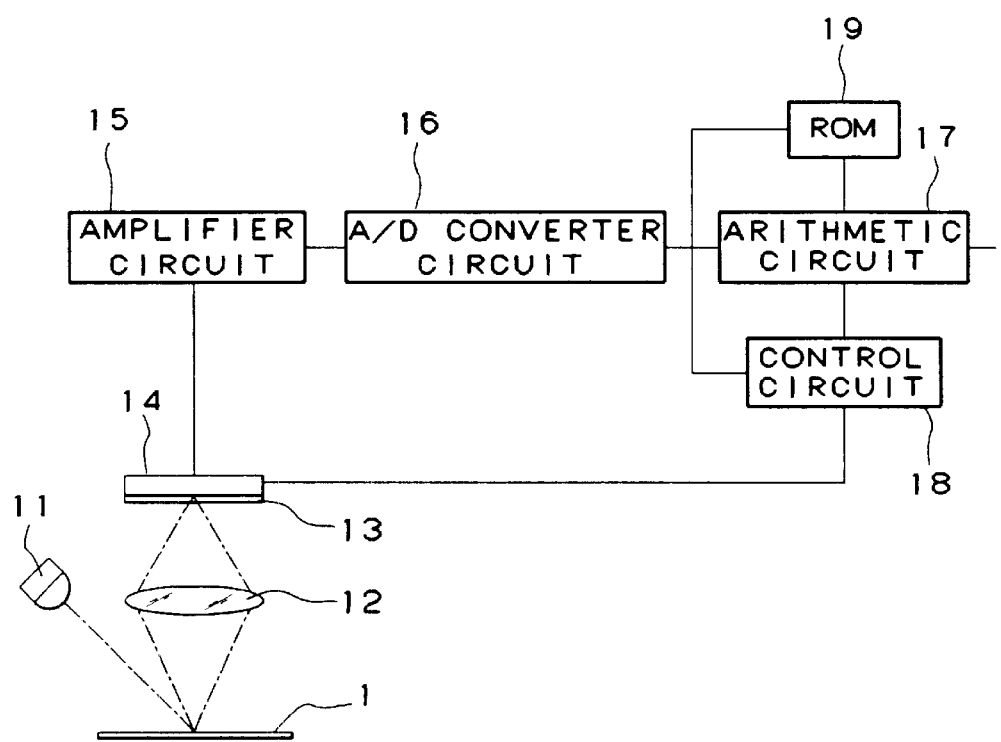
FIG. 8 is a block diagram showing the internal configuration of the reader.

The average exposure time is measured by a reader as shown in FIG. 7 and FIG. 8. That is, FIG. 7 shows the appearance of the reader 10 and FIG. 8 shows the internal configuration of the reader 10. This reader 10 specifies a temperature by the input of a time. The reflectance characteristics of the temperature indicator 4 which are determined by temperature and time are written as digital values at addresses in a ROM 19 incorporated in the reader 10. Reflectance (digital value) which is stored at an address determined by time and temperature written in the ROM 19 is compared with reflectance at the time of measurement to specify a temperature. A time is input from the outside, the temperature is presumed to be 0° C., 5° C., 10° C., 15° C. . . . to 40° C. sequentially, the pre-recorded reflectance of the temperature indicator 4 is read and compared with reflectance at the time of actual measurement, and a temperature and a time (input from the outside) are obtained from the address of the most closest reflectance.

This will be described more specifically. A red LED light source 11 which is absorbed by GN-2 (peak wavelength of 660 nm) is used as the light source of the reader 10. Light from the LED light source 11 is irradiated onto the temperature control material 1 and the quantity of reflected light changes according to the difference of reflectance between color developed portions and portions where color development does not proceed. Reflected light passes through a filter 13 for transmitting only irradiation by a lens 12 and is condensed upon a photodetector 14. Output which changes according to the quantity of light is amplified by an amplifier circuit 15 into a signal which will be processed by an A/D converter circuit 16. The A/D converter circuit 16 converts an analog value from the amplifier circuit 15 into a digital signal. This conversion is set such that the level of a signal having a reflectance of 0.7 becomes 255 (FFH) and the level of a signal having a reflectance of 0.2 becomes 0 (00H) and an analog signal having the intensify of reflected light which changes according to reflectance is converted into a digital 8-bit signal. The conversion timing is controlled by a control circuit 18. The digital signal obtained by the A/D converter circuit 16 is processed by an arithmetic circuit 17. The arithmetic circuit 17 compares data on reflectance stored at addresses which are determined by data on the temperature of the temperature indicator 4 and a time input from the outside stored in the ROM 19 with data from the A/D converter circuit 16 and can specify a storage environmental temperature and a time from the address written in the ROM 19 which stores matched or the most closet reflectance data.

This state will be described more specifically. FIG. 9 shows data in the table of the ROM 19. The data table of the ROM 19 has addresses for different temperatures and times. The meaning of each address is shown in FIG. 10. Data on reflectance at 0° C. to 40° C. (units of 5° C.) for 0 to 48 hours (units of 1 hour) are stored in the ROM 19. Digital values of reflectance at 0° C. for 0 hour, after 1 hour and after 2 hours are stored at addresses 0000H, 0001H and 0002H, respectively. A digital value of reflectance at 0° C. after 48 hours is stored at an address 0030H. Similarly, data on reflectance at 5° C. are stored at 0040H to 0070H, data on reflectance at 10° C. are stored at 0080H to 00B0H, . . . data on reflectance at 15° C. are stored at 00C0H to 00E0H, and data on reflectance at 40° C. are stored at 0200H to 0230H.

When time data (storage time) is input from the input unit (not shown) of the reader 10, measurement is started. As described above, the analog output of reflected light from the photodetector 14 is converted into a digital signal by the A/D converter circuit 16. The control circuit 18 reads data from addresses in the ROM 19 corresponding to the time data from the input unit. For example, when "24 hours" is input, 8-bit data stored at addresses 0018H, 0058H, 0098H, . . .

0164H, . . . and 0218H are read one after another. The read 8-bit signals are compared with the 8-bit signal digitized by the A/D converter circuit 16. Stated more specifically, under the following conditions:

input time data: 24 hours signal from the A/D converter circuit 16: 66H data from ROM:

0018H:C5H . . . data on reflectance at 0° C. after 24 hours

0058H:BFH . . . data on reflectance at 5° C. after 24 hours

0098H:A8H . . . data on reflectance at 10° C. after 24 hours

0158H:66H . . . data on reflectance at 25° C. after 24 hours

0218H:05H . . . data on reflectance at 40° C. after 24 hours the arithmetic circuit 17 judges that the temperature indicator is kept at around 25° C. and sends the data to a subsequent step (not shown).

The ROM 19 stores data on reflectance at a temperature lower than the glass transition temperature Tg of the temperature indicating material. It is necessary to choose Tgr according to storage environmental temperature. The method remains the same except that the table data of the ROM 19 are changed even when the color development speed is changed by choosing a different resin. The storage environment time is input manually in this embodiment. The temperature control method of this embodiment in which time information at the time of initialization is provided to the temperature control material 1 and a storage time is calculated from a time when the information is actually read by the reader 10 to detect a time and a temperature will be described hereinunder.

The temperature indicator 4 used in this temperature control method is as follows.

| <temperature indicator 5> | |
|---|---|
| leuco dye: GN-169 (Yamamoto Kasei Co., Ltd.) | 1 part by weight |
| developer: PG | 1 part by weight |
| reversible material: PRN | 10 parts by weight |
| binder resin: A-91 | 4 parts by weight |

The production method of this temperature indicator 4 is the same as that of <temperature indicator 1>. Although Tgr is 44.5° C. and Tgc is 126° C. which are the same as those of <temperature indicator 1>, the leuco dye is different and the equilibrium coefficient with the developer is different, whereby it is considered that the color development speed and the density are different. This temperature indicator 4 is such that the glass transition temperature Tgr of the temperature indicating material is set lower than the glass transition temperature Tgc of the binder resin and higher than the measurement environmental temperature like <temperature indicator 1> to <temperature indicator 4>. The erasure characteristics of the temperature indicator 4 are almost the same as those of <temperature indicator 1> and the density of the temperature indicator is almost completely erased with an application energy of the thermal head of 0.55 mJ/dot.

The temperature control method is carried out by the control of color development though the temperature indicator 4 of the temperature control material 1 is erased and the erased portion starts color development based on the relationship between temperature and time. Stated more specifically, right before the start of temperature control, a code which includes at least time information and is readable mechanically is printed. For example, "49980400001" (it means 0:00 on Apr. 1, 1998) is printed. To print this, a portion to be erased is applied with an energy of 0.55 mJ/dot by the above thermal head. Further, article information is recorded on heat sensitive paper by applying an energy of about 0.4 mJ/dot. The detection of a temperature is carried out by reading the intensity of reflected light (change rate) in the erased portion of the temperature indicator 4.

Figure 11A:
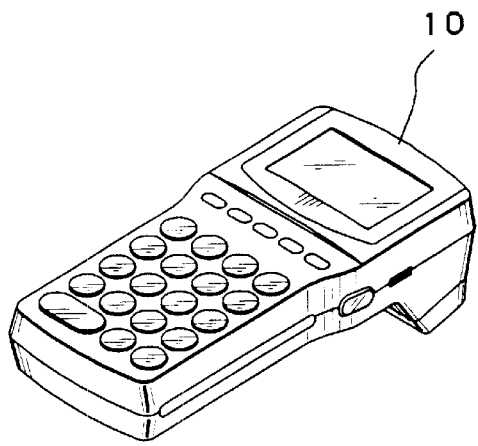
FIG. 11(A) is a perspective view of the appearance of the reader.
Figure 11B:
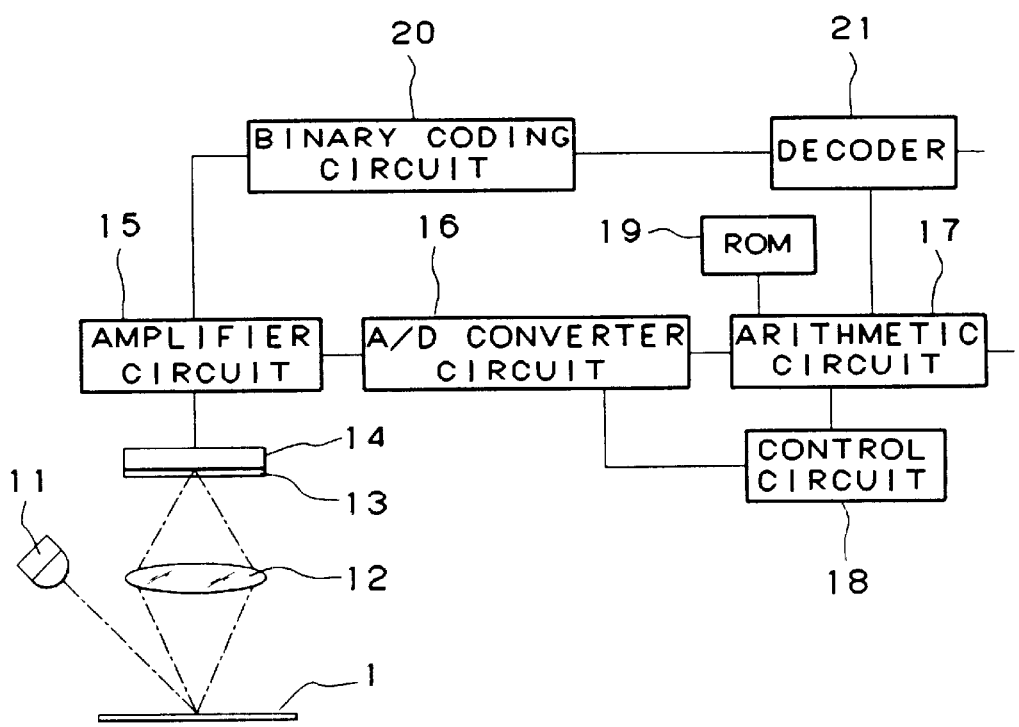
FIG. 11(B) is a block diagram showing the internal configuration of the reader.

How to read the intensity of reflected light will be described with reference to FIG. 11. In a reader 10 whose appearance is the same as that of a general bar code reader, light irradiated from a light source 11 having at least a wavelength absorbed at the time of color development (GN169 has absorption at a red region) is reflected by the temperature control material 1 and condensed upon a photodetector 14 through a filter 13 by a lens 12. The photodetector 14 is a line sensor such as a CCD and can detect bar portions and space portions at the same time. The output of the photodetector 14 is amplified to a required amplitude by an amplifier circuit 15 and the amplified signal is supplied to a binary-coding circuit 20 and an A/D converter circuit 16. The binary-coding circuit 20 binary codes the output of the photodetector 14 according to the difference of intensity of reflected light based on the reflectance of the bar code 8. The bar code 8 which is binary-coded time information is decoded by a decoder 21 and supplied to an output A and an arithmetic circuit 17. The output A is connected to a controller such as a display unit (not shown). The amplified signal is connected to the A/D converter circuit 16 to be converted into a digital signal which is then supplied to the arithmetic unit 17 under the control of a control circuit 18. The arithmetic unit 17 calculates the time elapsed from time information from the timer (not shown) of the reader 10 and a temperature control start time by the decoder 21, reads data from the ROM 19 which stores the temperature indicating characteristics of the temperature indicator 4 for the time elapsed, compares them and carries out computation to take the closest information as an average exposure temperature. Stated more specifically, suppose that the time when temperature control is started is 0:00 on Apr. 1, 1998 and the measurement time is 3:00 on Apr. 2, 1998. A bar code is decoded by the decoder 21 to find that the time elapsed is 27 hours. Data on reflectance at 0 to 40° C. are read from addresses for data after 27 hours one after another and compared. The table of the ROM 19 is shown in FIG. 12. The data of the table are 8-bit digital values obtained by digitizing the intensities of light reflected from the temperature indicator 4.

Figure 13:
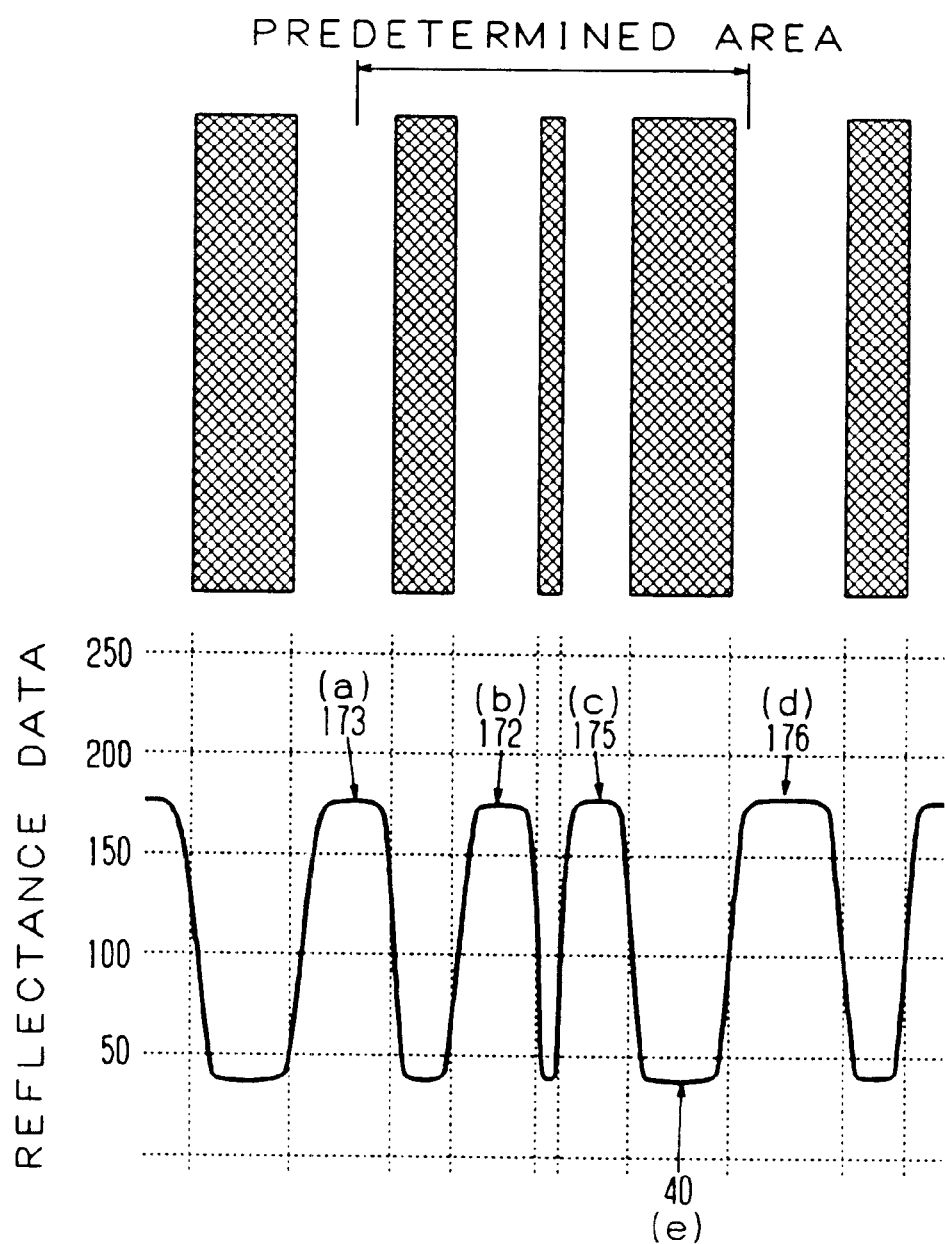
FIG. 13 is a table showing an example of a digital signal.

The addresses for data after 27 hours are 1BH ( is determined by temperature) and 0° C. to 40° C. data are read from 1B00H to 1B28H (where 0° C. to 40° C. data after 27 hours are stored) one after another and compared with A/D converted data. This method is shown in FIG. 13. Out of a plurality of data on a line from the photodetector 14 such as a CCD, the largest value converted by the AD converter circuit 16 out of the bits identified as space portions in the predetermined central area (the central area of the lens 12 is bright and has excellent S/N ratio but the present invention is not limited to this) is used for determination.

That is, in FIG. 13, suppose that portions identified as a space area are (a), (b), (c) and (d) and the largest values in these areas are 173, 172, 175 and 176. The arithmetic circuit 17 determines that the largest value of the predetermined area is 176 (B0H). When the largest value is calculated and not binary-coded by the decoder 21, the reader determines that a error occurs and displays an alarm that the temperature indicator is exposed to a temperature higher than the predetermined temperature for a long time (display unit). When the A/D converted value at the time of measurement is 176 (B0H), the difference between the bar code 8 which is time information from the decoder 21 and the time of reading is 27 hours, and the arithmetic circuit 17 reads data on reflectance at 0° C. (1B00H) to 40° C. (1B28H) after 27 hours from the ROM 19 and compares the data with the above A/D converted value B0H, the converted value agrees with reflectance data stored at 1B19H in the ROM 19. Therefore, it is confirmed that the temperature control material 1 is kept at 25° C. for 27 hours and "19H" is output to an output B. The largest value in a certain area is used for determination as the A/D converted value. The present invention is not limited to this and an average value in the space portions may be used. The largest value is directly obtained from a signal from the A/D converter circuit 16 by the arithmetic circuit 17 and used for determination. A line memory or the like may be provided to store data for 3 lines and the A/D converted value at the time of measurement may be obtained by averaging the data.

To improve accuracy, the method of determination with the ratio of the largest value to the smallest value in an area shown in FIG. 13 as the digital value from the A/D converter circuit 16 will be described hereinunder.

The constitutions of the temperature indicator 4 and the temperature control material 1 are the same as those described above. The constitution of the reader 10 is the same as well. In the above method, only the intensity of reflected light (reflectance) in each color fading portion which develops a color according to temperature is detected. The ratio of the intensity of reflected light in a bar portion to that in a space portion (reflectance ratio) is detected, thereby making it possible to overcome such a problem as uneven coating to a certain degree. The temperature table in this case is shown in FIG. 14.

Since the smallest value of the A/D converted value in the bar portion of the area shown in FIG. 13 is 40 and the largest value of the fading portion is 176, the reflectance ratio is obtained from the equation, $$\text{reflectance ratio} = \text{int}\{(A-Sd)/W \times 255\}.$$

A: the intensity of reflected light (reflectance) upon erasure at the start of the temperature control of the temperature indicator Sd: data obtained from the A/D converted value W: the largest amplitude of the temperature indicator (reflectance at the time of erasure—reflectance at the time of coating)

The ratio of intensity of reflected light at each temperature for each time when A is 250 and W is 210 is stored.

A signal from the photodetector 14 of the reader 10 is amplified by the amplifier circuit 15, and the amplified signal is converted into a digital value by the A/D converter circuit 16. The largest digital value (reflectance) and the smallest digital value (reflectance) in the predetermined area near the center shown in FIG. 13 are obtained by the arithmetic circuit 17 and further the ratio of intensity of reflected light (reflectance ratio) is calculated. The bar code 8 which is time information is decoded by the decoder 21 to obtain a temperature control start time, a storage time is grasped from the difference between the temperature control start time and the time of reading, and reflectance ratios at 0 to 40° C. based on that time are compared with the above reflectance ratio to obtain a storage temperature. In concrete terms when the A/D converted value is 176, the reflectance ratio becomes 89 (59H) which agrees with data at an address 1B19H in the ROM 19, whereby it can be detected that the storage temperature is 25° C. Calculation from the reflectance ratio makes it possible to reduce the influence of uneven density at the time of coating. Higher-accuracy detection is made possible by giving table values in the ROM 19 in smaller temperature units and smaller time units.

The present invention is not limited to the temperature indicator of this embodiment. Electron donor organic substances such as leuco auramines, diaryl phthalides, polyaryl carbinols, acyl auramines, aryl auramines, rhodamine B lactams, indolines, spiropiranes, fluorans, cyanine dyes and crystal violet may be used as the electron donor color developing compound.

Stated more specifically, when a red light source is used, a leuco dye which develops a blue, black or blue green color can be used.

As for black, the following leuco dyes can be used (though the present invention is not limited to these): PDS-150, PSD-184, PSD-300, PD-802 and PSD-290 (Nippon Soda Co., Ltd.), CP-101, BLACK-15 and ODB (Yamamoto Kasei Co., Ltd.), ETAC, ATP, BLACK-100, S-205, BLACK-305 and BLACK-500 (Yamada Kagaku Co., Ltd.), and TH-107 (Hodogaya Kagaku Co., Ltd.).

As for blue, the following leuco dyes can be used (though the present invention is not limited to these): CVL and BLMB (Nippon Sod Co., Ltd.,), BLUE-63 and BLUE-502 (Yamamoto Kasei Co., Ltd.), BLUE-220 (Yamada Kagaku Co., Ltd.), and BLUE-3(Hodogaya Kagaku Co., Ltd.).

As for blue green, the following dyes can be used: GN-169, GN-2 and Green-40 (Yamamoto Kasei Co., Ltd.) and Green-300 (Yamada Kagaku Co., Ltd.).

Red or yellow dyes can be used by changing the wavelength of the light source of the reader. Further, two or more of the above dyes may be mixed together.

As for the electron acceptor compound, PG has been described as the developer of this embodiment. The present invention is not limited to this. Oxides of phenols, phenol metal salts, carboxylic acid metal salts, sulfonic acid, sulfonates, phosphates, phosphoric acid metal salts, acidic phosphates, acidic phosphoric ester metal salts, phosphites and phosphorous acid metal salts may be used. Illustrative examples of the electron acceptor compound include 2,4-dihydroxyacetophenone (2,4-HAP), 2,5-HAP, 2,6-HAP, 3,5-HAP, 2,3,4-HAP, 2,4-dihydroxybenzophenone (2,4-HBP), 4,4'-HBP, 2,3,4-HBP, 2,4,4'-HBP, 2,2',4,4'-HBP, 2,3-dihydrobenzoic acid, methyl 3,5-dihydrobenzoate, 4,4'-biphenol and 2,3,4,4'-tetrahydrobenzophenone.

The electron acceptor compound has a great influence upon the color development speed (after the electron acceptor compound is separated from the reversible material, the time elapsed before it is associated with the electron donor compound and develops a color is greatly changed by this material). The temperature control time can be changed by choosing this material.

It is possible to lay emphasis on a temperature range to be controlled by means of the reversible material. When pregnenolone shown in this embodiment is used, the glass transition temperature of the obtained temperature indicator is 44° C. and color development starts at a temperature lower than this glass transition temperature though the color development speed greatly changes at this temperature. As shown in FIG. 14 of this embodiment, the sensitivity is sufficiently high at 25 to 40° C. but there is no big difference in reflectance at 0 to 10° C. and it is considered that it is difficult to control a temperature range. However, it is made possible to control a temperature range to be emphasized by using the following reversible materials in place of pregnenolone. When stanolone is used, for example, reflectance at a temperature range of around 10 to 30° C. can be measured relatively accurately. When cholesterol is used, reflectance at a temperature range of 5 to 25° C. can be measured relatively accurately.

reversible material/glass transition temperature/measurable temperature/temperature range to be emphasized

| | |
|---|---|
| 1. Stanolone | less than 34° C. |
| 2. β-Sitosterol | less than 70° C. |
| 3. Methylandrostenediol | less than 65° C. |
| 4. Estradiol Benzoate | less than 50° C. |
| 5. Pregnenolone Acetate | less than 15° C. |
| 6. Androsterone | less than 32° C. |
| 7. 11α-Hydroxyprogesterone Acetate | less than 33° C. |
| 8. Lanosterol | less than 32° C. |
| 9. Tiogenin | less than 63° C. |
| 10. Esmilagenin | less than 63° C. |
| 11. Cholesterol | less than 28° C. |

The temperature to which the temperature indicator responds sensitively can be changed by choosing one from these reversible materials.

There is the possibility that reflectance can be measured very accurately by using and mixing a plurality of reversible materials. The present invention is not limited to these reversible materials and a reversible material which can change color development speed and color density at a temperature lower than the glass transition temperature may be used.

A binder resin having an appropriate glass transition temperature (or softening temperature) may be used as the binder resin in consideration of color development speed and a measurement temperature range. Illustrative examples of the binder resin include polyethylenes, chlorinated polyethylenes, ethylene copolymers such as ethylene-vinyl acetate copolymer and ethylene-acrylic acid-maleic anhydride copolymer, polyesters such as polybutadienes, polyethylene terephthalate, polybutylene terephthalate and polyethylene naphthalate, polypropylenes, polyisobutylenes, polyvinyl chlorides, polyvinylidene chlorides, polyvinyl acetates, polyvinyl alcohols, polyvinyl acetals, polyvinyl butyrals, fluororesins, acrylic resins, methacrylic resins, acrylonitrile copolymers, polystyrene, polystyrene halide, styrene copolymers such as styrene-methacrylic acid copolymer, acetal resins, polyamides such as nylon 66, polycarbonates, cellulose-based resins, phenolic resins, urea resins, epoxy resins, polyurethane resins, diaryl phthalate resins, silicone resins, polyimide amides, polyether sulfones, polymethyl pentenes, polyether imides, polyvinyl carbazoles, amorphous polyolefins and the like. They may be used alone or in admixture.

In this embodiment, a PET base is used but the present invention is not limited to this. In this embodiment, a label is used but a heat transfer ink ribbon, heat sensitive paper or necessary portions coated with the temperature indicator by printing may be used.

The temperature control material thus obtained is inexpensive and the control of various required temperature ranges is made possible by changing the material.

The present invention is a temperature control material comprising a temperature indicator which responds to temperature partly or wholly to change its color and information set by the temperature indicator, wherein the temperature indicator is a material whose developed color density changes according to temperature, which is irreversible at environmental temperature and changes its color according to crystal or non-crystal, or phase separation of non-phase separation, and whose glass transition temperature is set higher than control temperature. Therefore, the temperature control material does not develop a color abruptly and does not cause a change in the density of its color, thereby making it possible to carry out temperature control stably for a long time, and is simple in structure and inexpensive. The temperature control material can control the color development speed by changing the glass transition temperature of the binder resin to a temperature range higher than the glass transition temperature of the temperature indicating material, is inexpensive and can give an alarm and grasp the average control temperature. Further, the present invention is a temperature control method using a temperature control material comprising a temperature indicator which responds to temperature partly or wholly to change its color and information set by the temperature indicator, wherein the temperature indicator is a material whose developed color density differs according to temperature, which is irreversible at a temperature lower than environmental temperature and changes its color according to crystal or non-crystal, or phase separation or non-phase separation, and whose glass transition temperature is set higher than the measurement range of control temperature, and temperature control is carried out by irradiating the temperature indicator with light having a wavelength absorbed by a color developed by the temperature indicator and detecting the intensity of the reflected light or transmitted light. Therefore, it is possible to read a temperature to which the temperature indicator is exposed mechanically. In addition, since it is known from the quick color development of the temperature indicator as against the time for temperature control that the temperature indicator is exposed to a temperature higher than the glass transition temperature, thereby making it possible to give an alarm that the temperature indicator is exposed to an abnormal temperature environment.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

The present application is based on Japanese Priority Documents Hei 10-301237 filed on Oct. 22, 1998, Hei 10-301239 filed on Oct. 22, 1998, Hei 11-202848 filed on Jul. 16, 1999, and Hei 11-275875 filed on Sep. 29, 1999, the content of which we incorporated herein by reference.

What is claimed is:

1. A temperature control method comprising:
   the step of setting the glass transition temperature of a temperature indicator whose developed color density differs according to temperature, which becomes irreversible at outside temperature and which changes its color according to crystalline or non-crystalline state, or phase separation or non-phase separation, to a temperature higher than a control temperature;
   the step of carrying out temperature control by irradiating the temperature indicator with light having a wavelength absorbed by a color developed by the temperature indicator and detecting the intensity of the reflected light or transmitted light; and
   the step of giving an alarm that the temperature indicator is exposed to a temperature higher than its glassed transition temperature by the color development of the temperature indicator in a shorter time than the time for temperature control.

2. The temperature control method according to claim 1, wherein the temperature indicator includes time information, and the method further comprises the steps of:
reading the time information,
identifying the time of temperature detection,
computing a temperature control time from the time information and information on the time of detection, and
specifying an outside temperature to which the temperature control material has been exposed from the temperature control time and the intensity of the reflected light or transmitted light.

3. The temperature control method according to claim 2, further comprising the step of setting the time information in a machine readable object,
wherein an outside temperature to which the temperature control material has been exposed is specified from the ratio of intensity of reflected light and a temperature control time by reading the machine readable object.

4. The temperature control method according to claim 2, wherein the time information is set in a bar code, the intensities of reflected light from bar portions and space portions of the bar code are read, and an outside temperature to which the temperature control material has been exposed is specified from the ratio of the intensity of reflected light and a temperature control time.

5. A temperature control material comprising:
a temperature indicator containing a temperature indicating material, comprising:
an electron donor color developing compound for developing a color;
an electron acceptor compound for interacting with the electron donor color developing compound so as to develop color when an interaction between the electron donor color developing compound and the electron acceptor compound becomes large and fade color when the interaction becomes small; and
a reversible compound for changing interaction between the electron donor color developing compound and the electron acceptor compound reversibly;
wherein the temperature indicating material is initialized by quenching after heating over a melting point thereof so as to fade color,
wherein the temperature indicating material becomes irreversible at outside temperature, and
wherein the glass transition temperature of the temperature indicating material is set to a temperature higher than a control temperature as an expected temperature in the measurement environment.

6. A temperature control material according to claim 5, wherein the temperature indicating material includes a binder resin whose glass transition temperature is set to a temperature higher than a control temperature as an expected temperature in the measurement environment.

7. The temperature control material according to claim 6, wherein the glass transition temperature of the binder resin is higher than the glass transition temperature of the temperature indicating material.

8. The temperature control material according to claim 6 or 7, wherein a color development speed of the temperature indicating material can be controlled by the glass transition temperature of the binder resin.

9. A temperature control method comprising:
the step of setting the glass transition temperature of a temperature indicator containing a temperature indicating material, comprising:
an electron donor color developing compound for developing a color;
an electron acceptor compound for interacting with the electron donor color developing compound so as to develop color when an interaction between the electron donor color developing compound and the electron acceptor compound becomes large and fade color when the interaction becomes small; and
a reversible compound for changing interaction between the electron donor color developing compound and the electron acceptor compound reversibly;
wherein the temperature indicating material is initialized by quenching after heating over a melting point thereof so as to fade color,
wherein the temperature indicating material becomes irreversible at outside temperature, and
wherein glass transition temperature of the temperature indicating material is set to a temperature higher than a control temperature as an expected temperature in the measurement environment; and
the step of carrying out temperature control by irradiating the temperature indicator with light having a wavelength absorbed by a color developed by the temperature indicator and detecting the intensity of the reflected light or transmitted light.

10. A temperature control method comprising:
the step of setting the glass transition temperature of a temperature indicator containing a temperature indicating material, comprising:
an electron donor color developing compound for developing a color;
an electron acceptor compound for interacting with the electron donor color developing compound so as to develop color when an interaction between the electron donor color developing compound and the electron acceptor compound becomes large and fade color when the interaction becomes small;
a reversible compound for changing interaction between the electron donor color developing compound and the electron acceptor compound reversibly; and
a binder resin,
wherein the temperature indicating material is initialized by quenching after heating over a melting point thereof so as to fade color,
wherein the temperature indicating material becomes irreversible at outside temperature, and
wherein the glass transition temperature of the temperature indicating material is set to a temperature higher than a control temperature as an expected temperature in the measurement environment; and
the step of carrying out temperature control by irradiating the temperature indicator with light having a wavelength absorbed by a color developed by the temperature indicator and detecting the intensity of the reflected light or transmitted light.

11. A temperature control method comprising:
the step of setting the glass transition temperature of a temperature indicator containing a temperature indicating material, comprising:
an electron donor color developing compound for developing a color;

an electron acceptor compound for interacting with the electron donor color developing compound so as to develop color when an interaction between the electron donor color developing compound and the electron acceptor compound becomes large and fade color when the interaction becomes small; and a reversible compound for changing interaction between the electron donor color developing compound and the electron acceptor compound reversibly;

wherein the temperature indicating material is initialized by quenching after heating over a melting point thereof so as to fade color, wherein the temperature indicating material becomes irreversible at outside temperature, and wherein the glass transition temperature of the temperature indicating material is set to a temperature higher than a control temperature as an expected temperature in the measurement environment;

the step of carrying out temperature control by irradiating the temperature indicator with light having a wavelength absorbed by a color developed by the temperature indicator and detecting the intensity of the reflected light or transmitted light; and the step of giving an alarm that the temperature indicator is exposed to a temperature higher than its glass transition temperature by the color development of the temperature indicator in a shorter time than the time for temperature control.

12. The temperature control method according to claim 9, 10 or 11, wherein the temperature indicator includes time information, and the method further comprises the steps of:

reading the time information, identifying the time of temperature detection, computing a temperature control time from the time information and information on the time of detection, and specifying an outside temperature to which the temperature control material has been exposed from the temperature control time and the intensity of the reflected light or transmitted light.

13. The temperature control method according to claim 12, further comprising the step of setting the time information in a machine readable object, wherein an outside temperature to which the temperature control material has been exposed is specified from the ratio of intensity of reflected light and a temperature control time by reading the machine readable object.

14. The temperature control method according to claim 12, wherein the time information is set in a bar code, the intensities of reflected light from bar portions and spaces portions of the bar code are read, and an outside temperature to which the temperature control material has been exposed is specified from the ratio of the intensity of reflected light and a temperature control time.

* * * * *

UNITED STATES PATENT AND TRADEMARK OFFICE
CERTIFICATE OF CORRECTION

PATENT NO.   : 6,382,125 B1
DATED        : May 7, 2002
INVENTOR(S)  : Tamura

It is certified that error appears in the above-identified patent and that said Letters Patent is hereby corrected as shown below:

<u>Title page,</u>
Item [30], Foreign Application Priority Data should read:
-- [30]     Foreign Application Priority Data

Oct. 22, 1998   (JP) ............................... 10-301237
    Oct. 22, 1998   (JP) ............................... 10-301239
    Jul. 16, 1999   (JP) ............................... 11-202948
    Sep. 29, 1999   (JP) ............................... 11-275875 --

Signed and Sealed this

Eighth Day of October, 2002

*Attest:*

*Attesting Officer*

JAMES E. ROGAN
*Director of the United States Patent and Trademark Office*